United States Patent
Lau et al.

(10) Patent No.: US 9,112,727 B2
(45) Date of Patent: Aug. 18, 2015

(54) METHOD AND APPARATUS FOR PROBABILISTIC ALLOCATION IN A SWITCH PACKET BUFFER

(75) Inventors: Michael Lau, Rockville, MD (US); Mark Griswold, Fremont, CA (US); Eugene Opsasnick, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 246 days.

(21) Appl. No.: 13/591,919

(22) Filed: Aug. 22, 2012

(65) Prior Publication Data

US 2014/0059303 A1     Feb. 27, 2014

(51) Int. Cl.
*G06F 12/00* (2006.01)
*H04L 12/00* (2006.01)
*H04L 12/54* (2013.01)
*H04L 12/931* (2013.01)
*G06F 3/06* (2006.01)

(52) U.S. Cl.
CPC ............... *H04L 12/56* (2013.01); *H04L 49/00* (2013.01); *G06F 3/0689* (2013.01)

(58) Field of Classification Search
CPC ...................... G06F 12/0607; G06F 12/0215
See application file for complete search history.

(56) References Cited

U.S. PATENT DOCUMENTS

| | | | |
|---|---|---|---|
| 6,603,705 B2 * | 8/2003 | Chen et al. ............... | 365/233.15 |
| 6,711,170 B1 * | 3/2004 | Brown ....................... | 370/395.7 |
| 7,986,696 B1 * | 7/2011 | Miliavisky et al. ........... | 370/392 |
| 2002/0149989 A1 * | 10/2002 | Calvignac et al. ........ | 365/230.03 |
| 2010/0287442 A1 * | 11/2010 | Pepin et al. .................. | 714/758 |
| 2012/0290808 A1 * | 11/2012 | Xu et al. ...................... | 711/165 |

* cited by examiner

*Primary Examiner* — Cheng-Yuan Tseng
*Assistant Examiner* — Craig Goldschmidt
(74) *Attorney, Agent, or Firm* — Sterne, Kessler, Goldstein & Fox P.L.L.C.

(57) ABSTRACT

Systems and methods of writing data to a buffer during a buffer cycle are described. The buffer has a plurality of buffer banks having various fill levels. The buffer determines a first portion of banks from the plurality of buffer banks. The first portion of banks unfilled banks. A rank can be assigned to each of the first portion of banks and a candidate set of banks chosen from the first portion of banks. A target bank is then chosen from the candidate set and the data is written to that bank. The ranking may be random. Furthermore, the target bank can be chosen based on ranking, fill level, or both.

19 Claims, 15 Drawing Sheets

METHOD AND APPARATUS FOR PROBABILISTIC ALLOCATION IN A SWITCH PACKET BUFFER

BACKGROUND

1. Field of the Invention

The invention relates to systems and methods that facilitate efficient storage of data in a buffer.

2. Related Art

Data packet switches receive data packets on a number of input ports, and are configured to route individual or groups of data packets to one or more output ports, based on their source and/or destination address. Packet switches typically include a packet buffer in order to hold received data packets until they are scheduled to be transmitted on outgoing links. A packet buffer generally includes several buffer banks that can store a number of entries. In some implementations, the individual buffer banks are able to execute a read access or a write access each buffer cycle, but not both. This limitation in the buffer bank capability can result in read/write conflicts, which are situations where an individual bank receives request to both read and write during a single read/write cycle and cannot perform both. Read/write conflicts limit the ability of a buffer to use all of its available physical address space, and therefore is undesirable.

For instance, consider the simple example of a buffer that consists of two banks such as that depicted in FIGS. 1A and 1B. As shown in FIG. 1A, buffer 102 comprises buffer bank A 104 and buffer bank B 106. Buffer bank A 104 is entirely filled and buffer bank B 106 has a single entry 108 stored in it. Accordingly, the buffer 102 is only slightly more than half full, but has an asymmetric (i.e., uneven) data distribution. FIG. 1A depicts a first example where buffer 102 receives a read request to read data 110 stored in bank A 104 and a write request to write data 112. In this situation, both requests can be executed; bank A 104 only has a single read request for data 110 and bank B 106 has ample space to store data 112 and no other read/write operations to perform that cycle. In this first example, buffer 102 has no read/write conflicts.

FIG. 1B depicts a second, more problematic example using the same buffer 102 as an example. In this second example, the buffer 102 receives a read request for data 108, which is stored in buffer bank B 106. Additionally, the buffer receives a request to write data 112. While the buffer can read data 108, it cannot write data 112 anywhere during the cycle because bank A 104 is full and bank B 106 must perform a read operation during the cycle, which precludes it from also writing. This situation constitutes a read/write conflict because, despite having sufficient space, bank B 106 cannot write data 112. Thus, as can be seen, the read/write conflict causes the buffer 102 to behave as if it is full even though it is nearly half empty.

One solution to the kind of problem outlined above would be to add extra buffer banks to a buffer to accommodate this situation. For instance, continuing with the example scenario depicted in FIGS. 1A and 1B, a third buffer bank C 114 could be added to buffer 102. Thus, in the event that the problematic second example depicted in FIG. 1B occurs, the buffer 102 could simply write the data 112 to bank C 114. This solution, however, requires the addition of an extra bank (or banks in many cases), which incurs extra direct and indirect costs. For instance, extra banks require additional overhead, but fail to provide any direct value because the capacity of the buffer 102 is still the capacity of banks A and B. Additionally, the extra banks require corresponding data structures to control their allocation and accounting. The solution of adding extra banks, therefore, leaves something to be desired.

BRIEF SUMMARY

Embodiments of the disclosure include systems and method of writing data to a buffer during a read/write cycle. According to embodiments, the buffer includes a plurality of buffer banks and a controller. The controller is configured to identify unfilled banks of the plurality of banks to define a first subset of banks of the plurality of banks. Each bank in the first subset of banks can have associated with it a corresponding data fill level. Additionally, the controller can be configured to assign a rank to the unfilled banks in the first subset of banks and select a predetermined number of banks of the first subset of banks having the lowest fill level values to form a candidate set of banks from the first subset of banks. The controller may also be configured to choose a first bank from the candidate set of banks based on the respective fill level of the bank or the assigned rank of the banks in the candidate set and to write at least a portion of data to the first bank.

According to other embodiments, a method of choosing a bank to write data to from among a plurality of banks in a buffer is provided. The method begins identifying unfilled banks of the plurality of banks to define a first subset of banks of the plurality of banks. Each bank in the plurality first subset of banks can have a corresponding data fill level associated with it. A rank may be assigned to the unfilled banks in the first subset of banks according to various embodiments. According to the method, a pre-determined number of banks having the lowest fill level values may be selected from the first subset of banks to form a candidate set of banks. A first bank of may be chosen from the candidate set based on at least one of the respective fill level value and the assigned rank of the banks in the candidate set. At least a portion of the data may be written to the first bank.

According to embodiments, a method of writing during a read/write cycle, data to a buffer having a plurality of banks is provided. According to the method, unfilled banks of the plurality of banks are identified to define a first subset of banks of the plurality of banks. Each of the banks in the first subset may have a corresponding data fill level associated with it. The banks in the first subset of banks can be randomly assigned a rank. At least a portion of the fill level value of the banks can be masked to create a modified fill level value for each bank in the first subset of banks. A pre-determined number of banks having the lowest modified fill level values can be selected from the first subset of banks to form a candidate set. A first bank having the lowest respective modified fill level value can be chosen from the candidate set. If two or more banks have the same modified fill level, then the bank with the highest randomly assigned rank can be chosen as the first bank. According to the method, at least a portion of the data can be written to the chosen first bank.

BRIEF DESCRIPTION OF THE DRAWINGS/FIGURES

DETAILED DESCRIPTION

The following detailed description of the present disclosure refers to the accompanying drawings that illustrate exemplary embodiments consistent with this disclosure. Other embodiments are possible, and modifications can be made to the embodiments within the spirit and scope of the disclosure. Therefore, the detailed description is not meant to limit the disclosure. Further, the scope of the invention is defined by the appended claims.

Figure 1A:
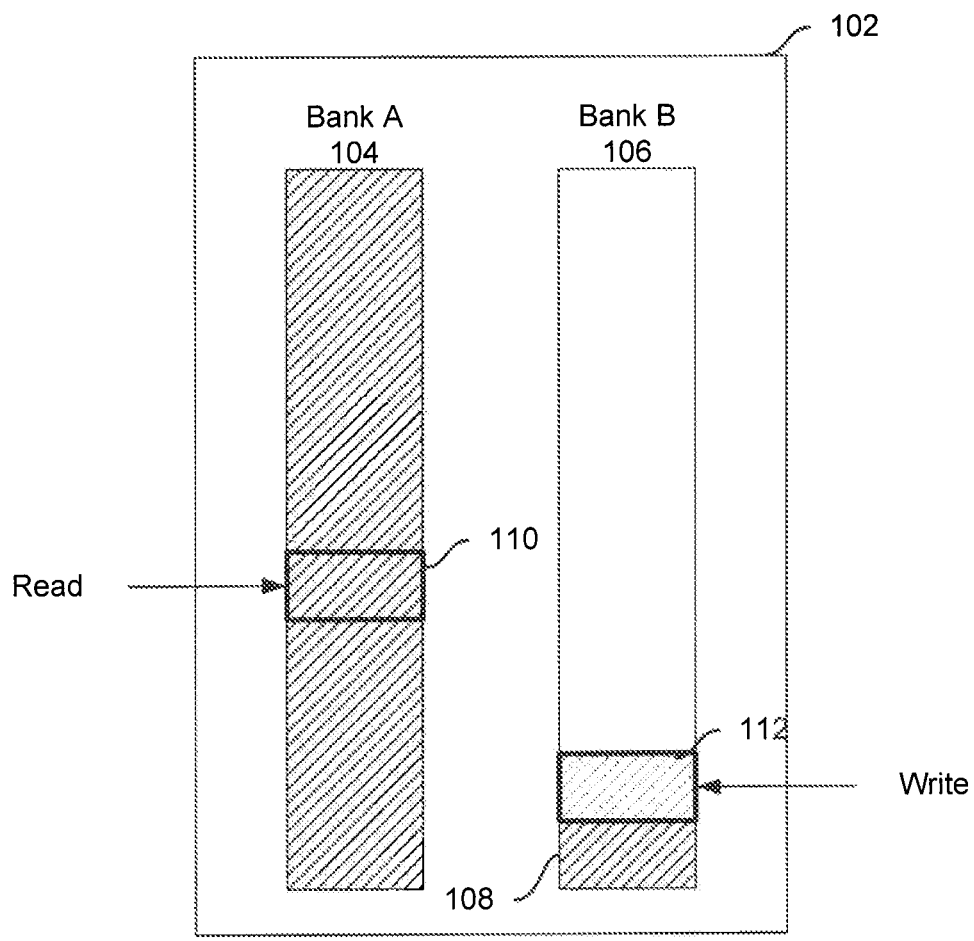
FIGS. 1A-1C illustrate a block diagrams depicting exemplary buffers.
Figure 1B:
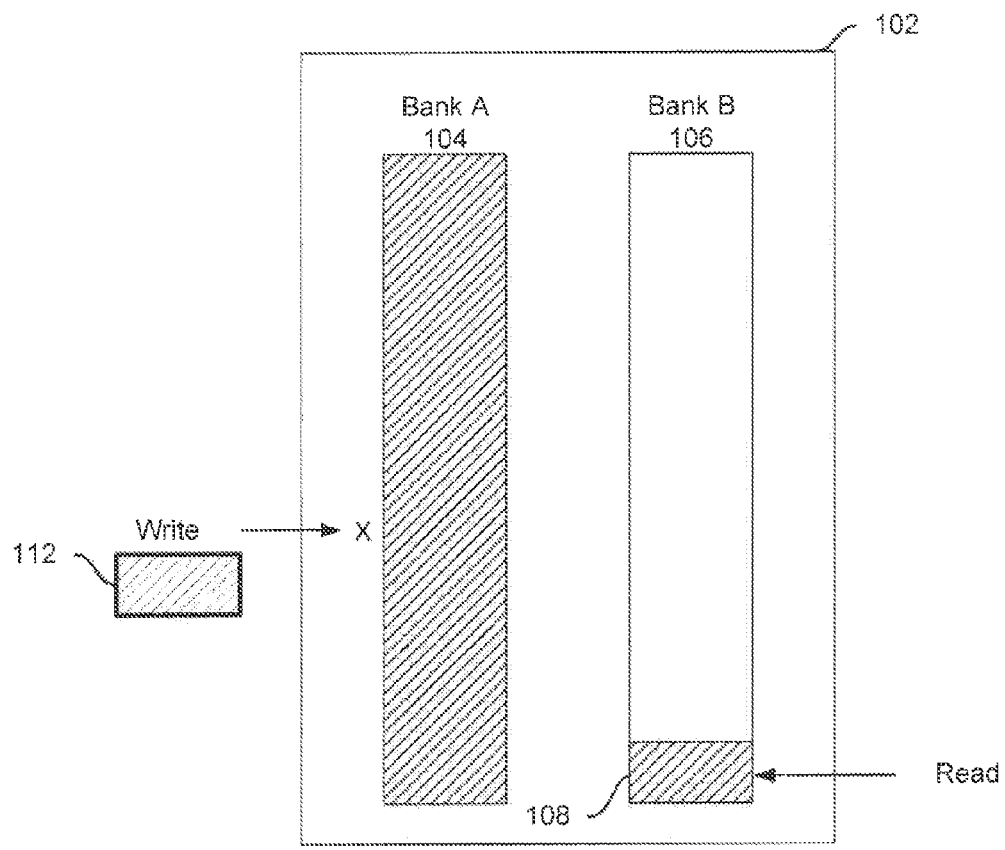
Figure 1C:
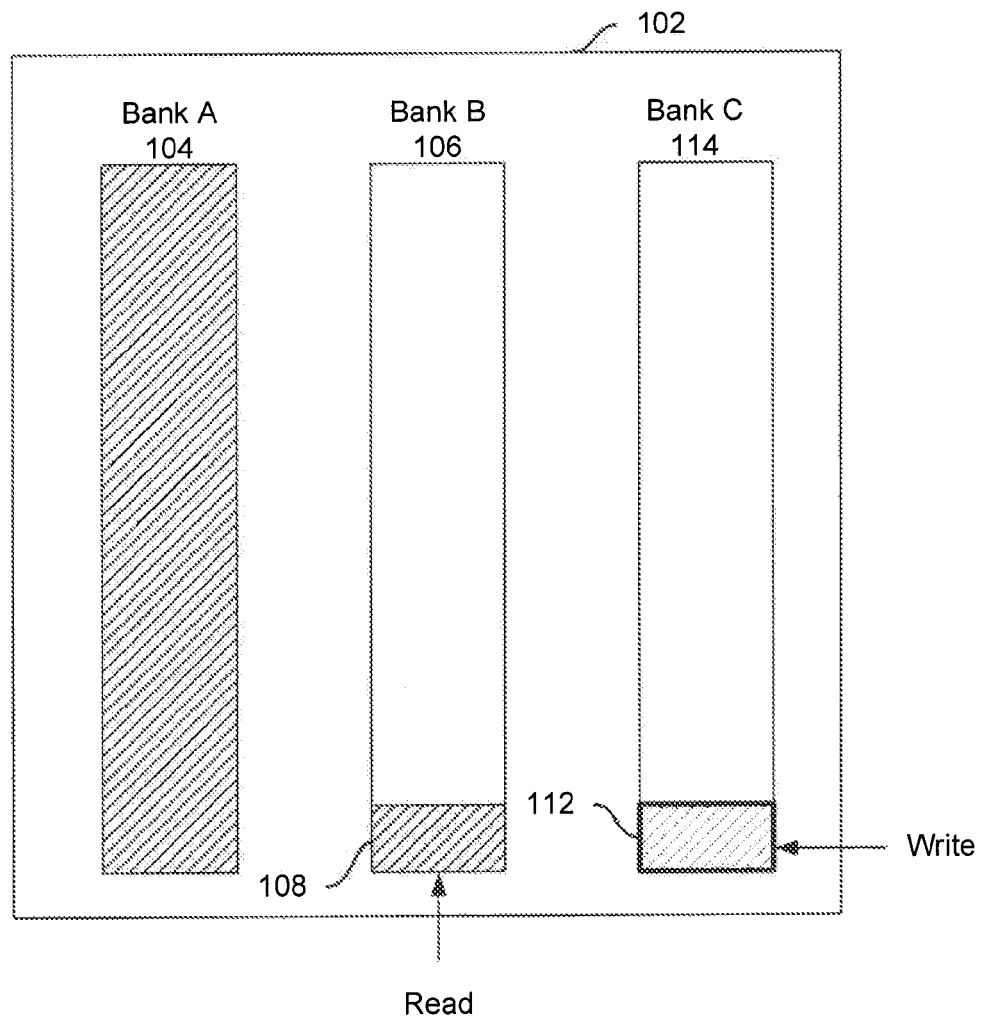
Figure 2:
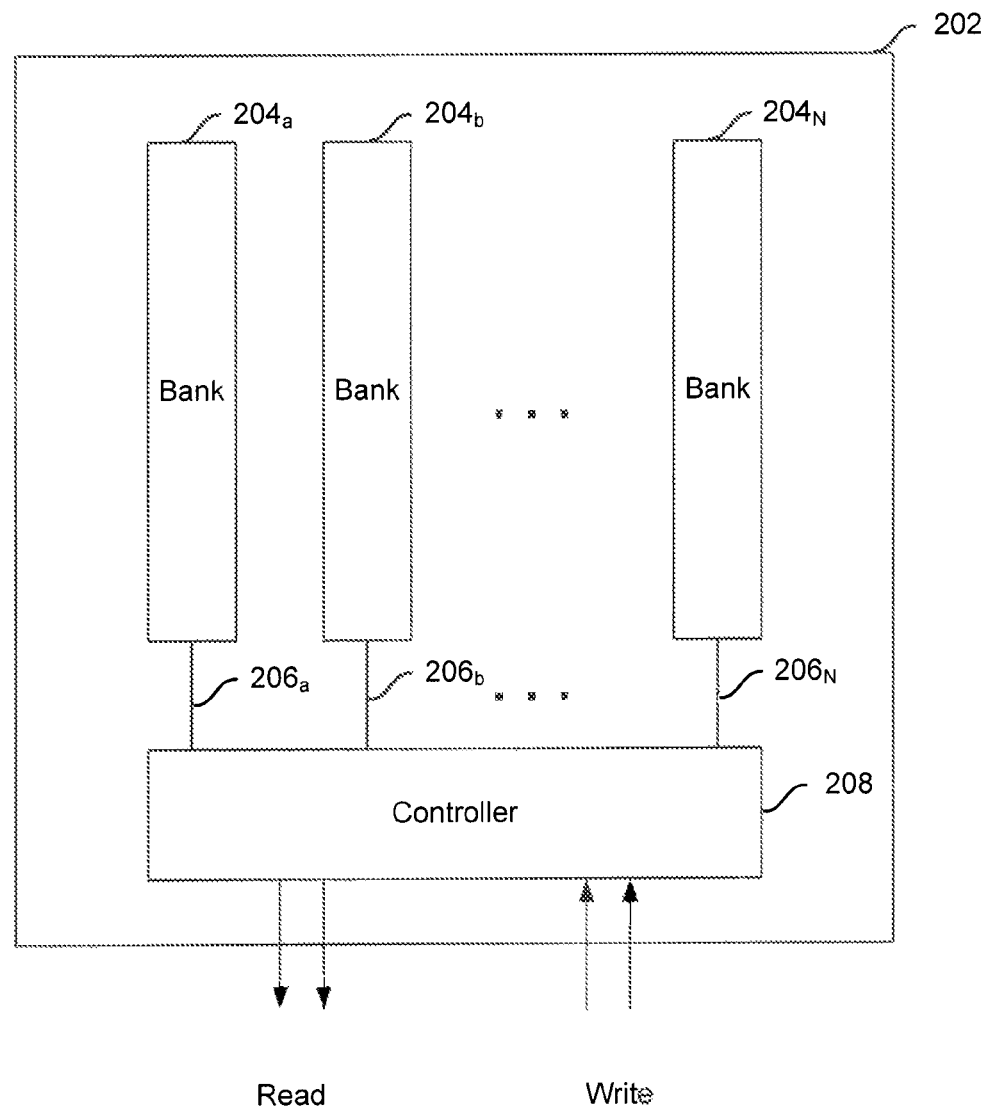
FIG. 2 illustrates a block diagram depicting a buffer with several buffer banks according to embodiments of the disclosure.

FIG. 2 depicts a data buffer according to embodiments of the disclosure, which can be used, for example, in a data packet switch or router. The buffer 202 comprises a number of buffer banks $204_a$, $204_b$, ..., $204_N$ (hereafter generically referred to as banks 204) and a buffer controller 208. According to embodiments of the disclosure, the buffer could, for instance, comprise B banks with each bank 204 having E entries to create a buffer that has B*E total entries. For instance, a buffer with 10 banks of 2,000 entries each would have 20,000 total entries. According to some embodiments, the buffer can be configured to various sizes by enabling and disabling individual buffer banks 204. For instance, the buffer could be configured to enable 25%, 50%, 75%, or 100% of the total capacity of the buffer banks.

As shown in FIG. 2, communications coupling $206_a$, $206_b$, ..., $206_N$ (generically coupling 206) couple the individual banks 204 to buffer controller 208. Coupling 206 could comprise any of a number of well-known coupling elements including, a bus, serial connections, parallel connections, etc. The controller receives read and write access requests from the host packet switch controller (not shown) and sends an appropriate instruction to the banks 204. For each read/write cycle (which can be one or more clock cycles and herein referred to as "cycle"), the buffer clock could, for instance, receive two read access requests and two write access requests, as shown. Of course, the number of read/write access requests can vary according to various embodiments based on a number of factors such as required bandwidth of the buffer, size of the buffer, etc.

When the controller receives a read request, it determines which of the banks 204 contains the requested data (e.g., a packet), accesses the requested data and returns it to the requester. The controller can then delete the data from the buffer bank 204 or maintain it according to various embodiments. For instance, a buffer 202 can delete unicast data (i.e. data having only a single destination) after performing a read operation. However, the buffer 202 may retain multicast data (i.e., data having multiple destinations) after a read access so that it remains available. When the controller receives a write request, it determines the appropriate bank in which to write the data according to embodiments of the disclosure and writes the data to that bank.

Figure 3:
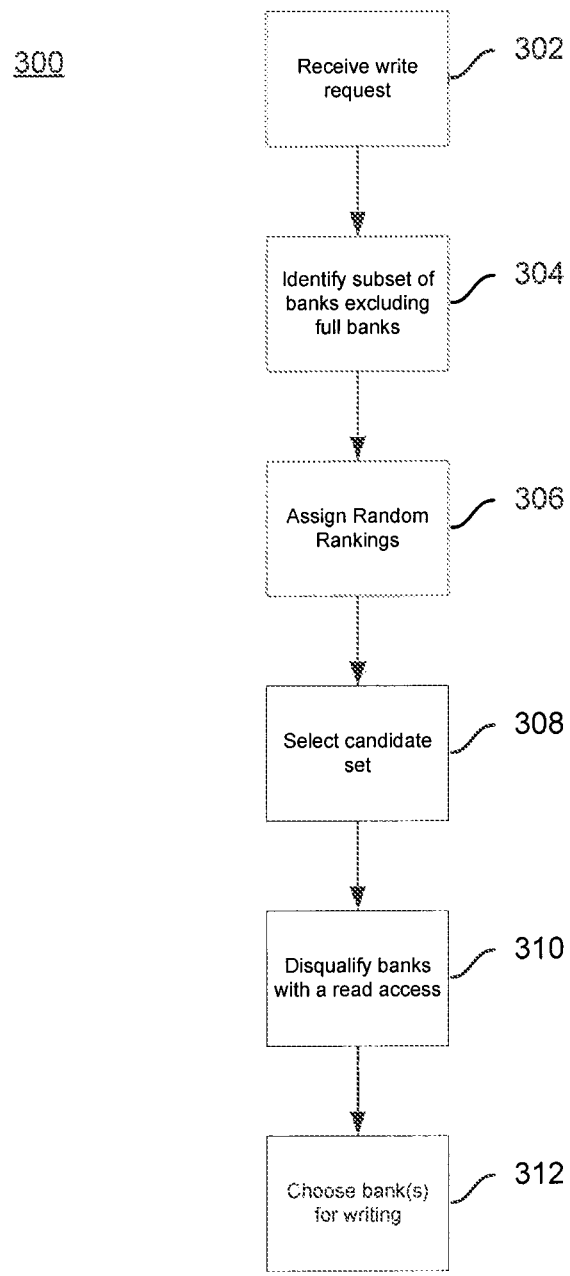
FIG. 3 illustrates a flow chart that graphically depicts a method of choosing a buffer bank to write data to according to embodiments of the disclosure.

FIG. 3 is a flowchart that depicts a method 300 of choosing the appropriate bank 204 in a buffer 202 for writing data to according to embodiments of the disclosure. According to the method, the buffer receives a request to write data during a particular cycle at step 302. The write request can include a request to write one or several data packets to store in the buffer. For instance, according to various embodiments, the write request might include a request to write two packets in a given cycle.

At step 304, the buffer can identify a first subset of the banks from the plurality of banks that comprise the buffer 202. According to some embodiments, the subset of banks includes some or all of the banks that remain unfilled. Full banks can be excluded at this step since they will not be able to accommodate a write request. At step 306, the buffer can assign a random ranking to each of the banks in the first subset of banks. According to some embodiments, the rank can be appended to the least significant bits (LSB) of the each bank's fill level. This random rank will ultimately act as a random tie breaker across all the banks in the subset. For instance, if two banks have equal fill levels, the random rank can break the tie.

After ranking at step 306, the method selects a candidate set of banks from the first subset at step 308. Preferably, the candidate set includes a pre-determined number of banks that have the lowest fill levels. According to various embodiments, the predetermined number must be a number sufficient to ensure that there will be sufficient banks to accommodate all of the write access requests in a given cycle. For instance, for a buffer configured to have two read and two write operations each cycle, the method might select four banks at step 308 since two of the selected banks might ultimately prove unusable if they have associated read operations in the same cycle. In general, according to various embodiments, at step 308 the method can select a pre-determined number of banks equal to the sum of the number of read requests and the number of write requests that a buffer receives in a cycle.

At step 310, the method disqualifies all of the banks that have a read access during the cycle. At step 312, the method chooses an appropriate number of banks for writing the data. According to various embodiments, the method can select the least filled bank (or banks when multiple data packets are being written) to write the data to. However, in the event of a tie in bank fill level, the method can select the bank or banks that have the lowest fill level and highest rank according to various embodiments. The randomness added to the bank selection process by the ranking helps to thwart adversaries (e.g., hackers) who might try to find and exploit a weakness in the buffer.

According to embodiments, different allocation strategies can be applied to different kinds of data. For instance, different allocation strategies could be applied to unicast and multicast packets. Unicast packets have a single destination and are, therefore, read once from the packet buffer. While, multicast packets may have a single destination, they are frequently sent to multiple destinations and, therefore, must be read from the buffer multiple times. The buffer can use an indication from the packet processing (PP) pipeline indicating whether the packet is unicast or multicast to choose the preferred policy. For instance, according to some embodiments, the buffer may allocate unicast packets to the least filled available banks using a method like method 300, discussed above. The buffer may also allocate multicast packets to a random non-full bank. To implement this policy, the system can use separate user-configurable masks for unicast and multicast packets. These masks can, for instance, be applied to the bank occupancies at the beginning of the selection process. Additionally, by ignoring the lower bits of fill level in the comparisons between the various banks, the buffer can increase the chance that multiple banks are considered equally filled and therefore subject to the random tie-breaker. In some instances (e.g., for the multicast packets) all bits of the fill level value are masked, unless the bank is full. This ensures that the buffer has an equal chance of selecting from all of the non-full banks.

Figure 4:
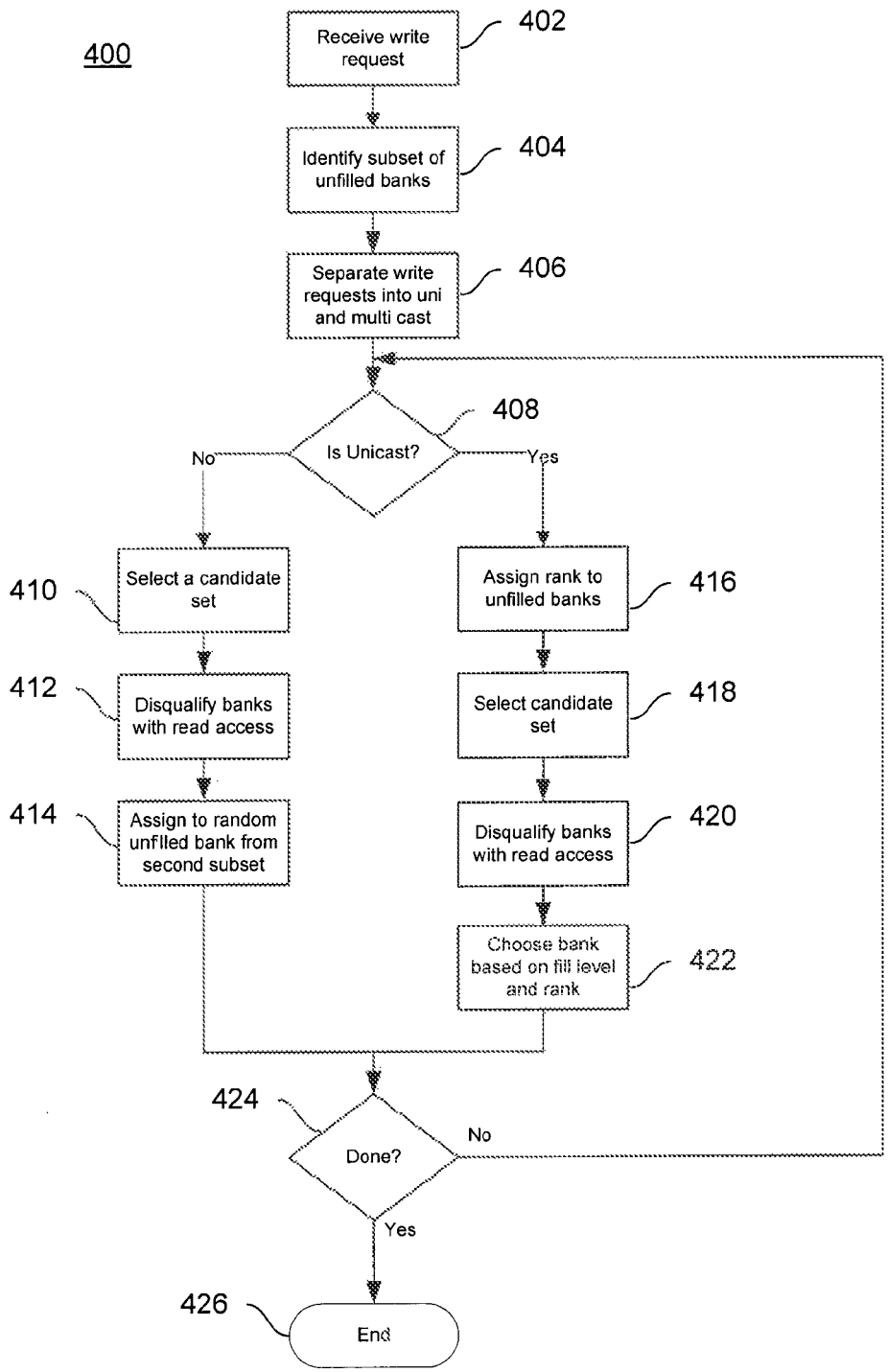
FIG. 4 illustrates a flow chart that graphically depicts a method of choosing a buffer bank to write data to according to embodiments of the disclosure.

FIG. 4 depicts a method 400 of applying different allocation strategies to different types of data according to embodiments of the disclosure. According to the method, the buffer 202 receives a write request at step 402. At step 404, the method identifies a subset of the buffer banks 204 that remain unfilled. According to some embodiments the subset could include all of the unfilled banks 204, however, the subset could also include fewer than all of the unfilled banks 204. According to various embodiments, the set of write requests in any given cycle could include both unicast and multicast data, which can each be handled slightly differently. Accordingly, at step 406, the method separates the write requests into unicast and multicast subsets. Preferably, the method will allocate banks for the unicast write requests first and then allocate banks for the multicast write requests since the unicast bank selection can be more stringent according to some embodiments. Accordingly, at step 408, the method determines whether the data for writing is unicast or multicast.

When, at step 408, the method 400 determines that the data is unicast, then the method can choose from among the unfilled banks in a similar method to that depicted in FIG. 3. For instance, the method can then assign random ranks to the unfilled banks at step 416 and selects a second subset of a pre-determined number of banks at step 418. Preferably, the second subset includes banks having the lowest fill levels, where the random ranks are used to break any tie between two or more lowest filled banks. According to various embodiments, the pre-determined number in the second subset is a number sufficient to ensure that there will be sufficient banks to accommodate all of the write access requests in a given cycle. For instance, for a buffer configured to have two read and two write operations each cycle, the method might select four banks at step 418 since two of the selected banks might ultimately prove unusable if they have associated read operations in the same cycle. As stated above, according to various embodiments, at step 418 the method can select a pre-determined number of banks equal to the sum of the number of read requests and write requests that a buffer receives each cycle.

At step 412, the method 400 can disqualify the banks that already have a read access associated with them during that cycle. And at step 422, the method 400 can choose a bank (or banks if writing multiple portions of data) based on its fill level and rank. For instance, if two of the banks have the same fill level, then the tie can be broken by the randomly assigned rank.

At step 424, the method 400 determine whether it is done. If yes, then the method ends at 426. However, if, for instance, the multicast banks have yet to be allocated, then the method loops back to step 408.

If at step 408, the method 400 determines that the remaining data for which banks need to be allocated is multicast, then the method selects a candidate set at step 410 from the available banks (i.e., banks that have not already been assigned for unicast data). At step 412, the method disqualifies banks with a read access from the candidate step. At step 414, the method 400 randomly chooses a bank from among the candidate set. The random selection can occur using any of a number of well-known methods. However, according to some embodiments, the random selection occurs by assigning a random rank to the banks in the candidate set and choosing the bank or banks with the highest rank.

The buffer controller 208 maintains a bank fill level value for each buffer bank 204, where the bank fill level value is a binary number that represents the fill level (or occupancy level) of the each bank's memory capacity. According to embodiments of the disclosure, the buffer can introduce a further layer of randomness into the bank selection scheme by masking one or more bits of the banks' fill level values, which decreases the precision of the bank fill level values. For instance, according to some embodiments, the buffer contains a register having a masking value that specifies the number of LSB bits of the bank fill level values that are masked to 0 before the comparison to determine the least filled banks. When this (masking) register is set to 0, then no bits are masked out, and therefore a tie occurs when two banks have the exact same fill level, as measured down the LSB of the fill level value. However, if the (masking) register is set to 3, then the lowest 3 bits of the bank fill level value are masked out for the comparison to determine the least filled banks. This masking of LSBs effectively creates "buckets" of bank fill level values so that any bank that is within the same boundary of a fill range may be considered as having the same fill level. This creates more ties when performing the comparison to determine the least filled banks, where the ties are broken with a random selection. For instance, if three bits were masked, then any bank in the same range of 8 fill levels would be considered to have the same fill level for fill level comparison purposes, and therefore subject to random selection.

Figure 5:
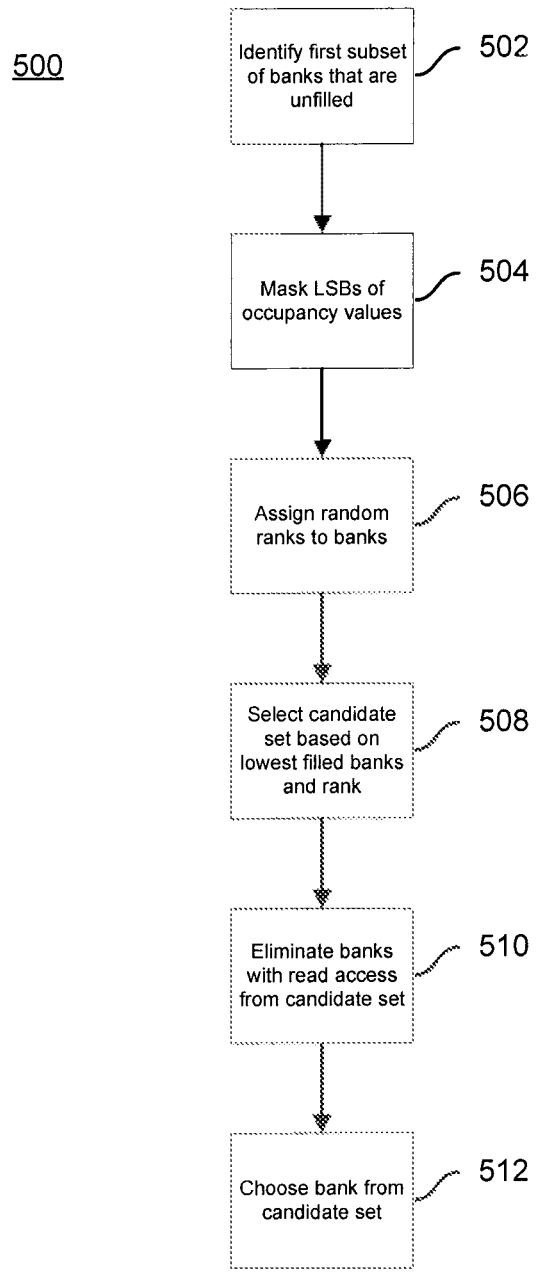
FIG. 5 illustrates a flow chart that graphically depicts a method of choosing a buffer bank to write data to according to embodiments of the disclosure.

FIG. 5 depicts a method 500 choosing a bank to write to with increased randomness of bank selection by masking the fill level values of buffer banks 204 according to embodiments of the disclosure. As shown in FIG. 5, the method begins by identifying a subset of banks that are unfilled at step 502. At step 504 a number of LSBs of the fill level values corresponding to the buffer banks are masked. According to embodiments of the disclosure, the number of bits masked at step 504 can be user-configurable, however, it could also be fixed at a particular number depending on a number of considerations such as degree of desired randomness, size of the banks, etc. At step 506, the banks are assigned random rankings. At step 508, the method selects a candidate set from the subset of unfilled banks, by selecting the banks with the lowest fill levels as determined from the masked fill level values. Additionally, the method can consider the ranks at step 508 to select the candidate set. According to various embodiments, the method 500 can select the candidate set by concatenating the fill level and random rank to create a metric for each bank and choose the candidate set based on the metrics. Further, the number of banks in the candidate set is equal to the total number of read access plus write access requests that occur in each read/write cycle. For instance, if a buffer performs two read access and two write accesses per cycle, then the method 500 would select a total of foul candidate banks for the candidate set at step 508. At step 510, any banks with read accesses are eliminated from the candidate set and at step 512, one (or more if multiple writes need to occur) of the banks is chosen based on its masked fill level value and its random rank, that can form the metric described above. In embodiments, the bank(s) with the lowest metric(s) is chosen for the write operation(s), or alternatively the bank(s) with the highest metric(s) is chosen for the write operation(s). The masked fill level value may also be referred to a modified fill level value herein.

Figure 6:
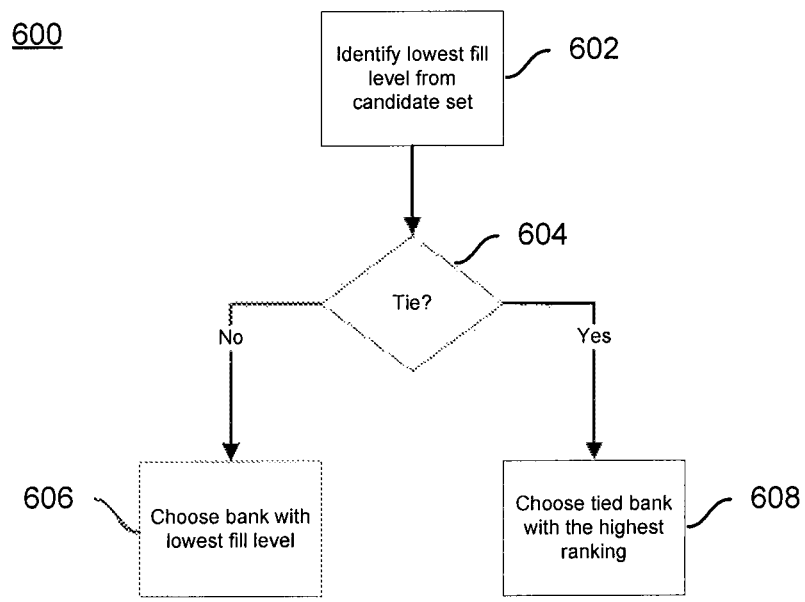
FIG. 6 illustrates a flow chart that graphically depicts a method of choosing a buffer bank to write data to according to embodiments of the disclosure.

FIG. 6 is a flowchart depicting an alternative method 600 of choosing a bank to write to based on fill level and randomly assigned rank according to embodiments of the disclosure.

For instance, method 600 could be used to perform step 312 of method 300, step 422 of method 400, according to various embodiments.

As shown in FIG. 6, the method first identifies the lowest fill level from a given set of candidate banks at step 602, based on comparing their fill level values, which may or may not have masked LSBs. Next, at step 604, the method determines whether more than one of the candidate banks has the same fill level. If not, then the method 600 simply chooses the bank (or banks) with the lowest fill level(s) for writing at step 606. If there is a tie in fill levels, then the method chooses the bank with the highest randomly assigned rank from among the tied banks at step 608. Note that with reference to the embodiment of FIG. 5, that no tie is possible, because the random rank is incorporated at the time the candidate set is determined, so that each metric will be unique.

FIGS. 7A-7F provide an example illustration of one or more of the methods described herein. FIGS. 7A-7F contain representations of a buffer 702 having eight buffer banks (I-VIII). Buffer banks I-VIII can each hold up to 7 data packets and are depicted in FIGS. 7A-7F as having various fill levels ranging from completely empty (e.g., bank III) to completely full (e.g., bank I). Table 1 summarizes the various fill levels of the banks shown in FIGS. 7A-7F, the binary equivalent of the fill level, and a masked equivalent with one bit masked. While table 1 shows the masked equivalent with one bit masked, this is for example purposes only and it should be understood that the invention also encompasses any number of bits being masked.

TABLE 1

| Bank | Fill Level | Binary Equivalent | Masked Equivalent |
|------|------------|-------------------|-------------------|
| I    | 7          | 111               | 11X               |
| II   | 1          | 001               | 00X               |
| III  | 0          | 000               | 00X               |
| IV   | 3          | 011               | 01X               |
| V    | 2          | 010               | 01X               |
| VI   | 4          | 100               | 10X               |
| VII  | 5          | 101               | 10X               |
| VIII | 1          | 001               | 00X               |

As can be seen in FIGS. 7A-7F and in table 1, Bank I has a fill level of 7, which renders it entirely full, bank II has a single entry B, which gives it a fill level of 1, bank III has no entries giving it a fill level of 0, and so on. Table 1 also illustrates the binary equivalent of the fill level, and corresponding masked fill value.

The buffer 702 depicted in FIGS. 7A-7F can be used to illustrate a method of choosing a buffer to write data to according to embodiments of the disclosure. For instance, assume that buffer 702 receives a request to read data from buffers IV and V in a given read/write cycle. Also, assume that buffer 702 receives two requests to write data units X and Y during the same cycle. The buffer 702 must determine where to write data units X and Y.

Figure 7A:
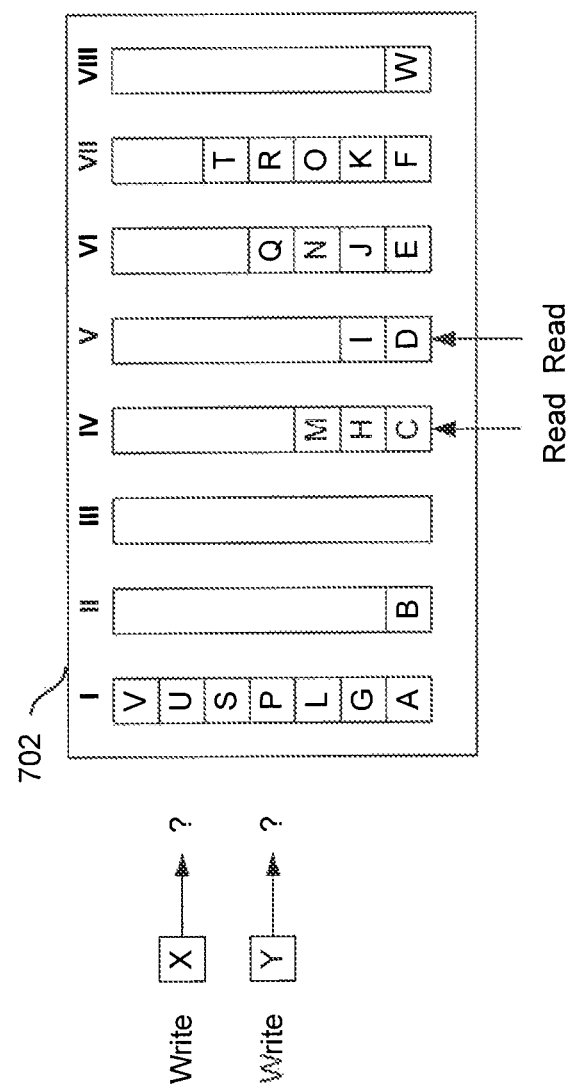
FIGS. 7A-7F illustrate a buffer with a number of buffer banks according to embodiments of the disclosure.
Figure 7B:
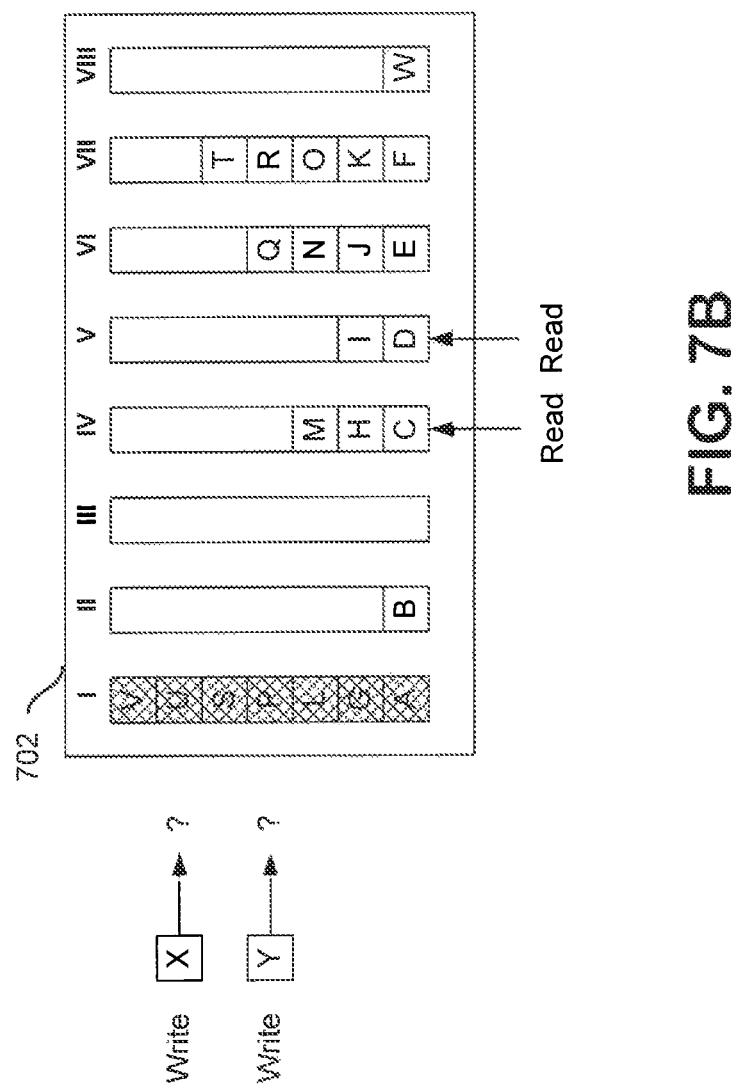

As discussed above, the buffer must determine a first subset of banks that comprises the un-filled banks and excludes filled banks. Accordingly, as shown in FIG. 7B, bank I is excluded from the first set of banks, which now includes banks II, III, IV, V, VI, VII, and VIII. According to the various embodiments the banks that are in the first set of banks are now assigned random rankings. Table 2 is an exemplary random ranking that might be assigned to the banks in the first set.

TABLE 2

| Bank    | II | III | IV | V | VI | VII | VIII |
|---------|----|-----|----|---|----|-----|------|
| Ranking | 5  | 4   | 3  | 1 | 6  | 2   | 7    |

Figure 7C:
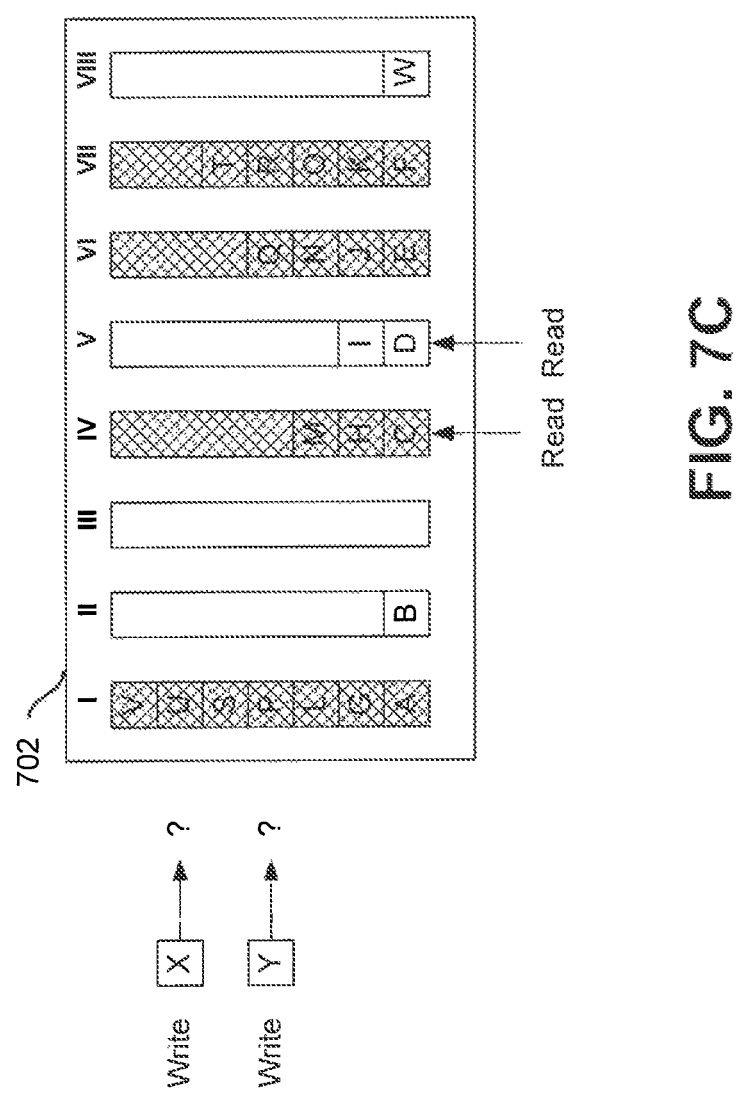

Next, a candidate set must be chosen from the ranked first set. This is illustrated in FIG. 7C. As noted above, the candidate set can include a pre-determined number of the lowest filled banks where the predetermined number is equal to the number of write accesses plus the number of read accesses in any given cycle. In this case, the buffer 702 has two read accesses and two write accesses in each cycle, so the candidate set preferably comprises four banks according to embodiments of the disclosure. Accordingly, as shown in FIG. 7C, the candidate set comprises banks II, III, V, and VIII, as they have the lowest fill levels. The remaining banks IV, VI, and VII are excluded in this example.

Figure 7D:
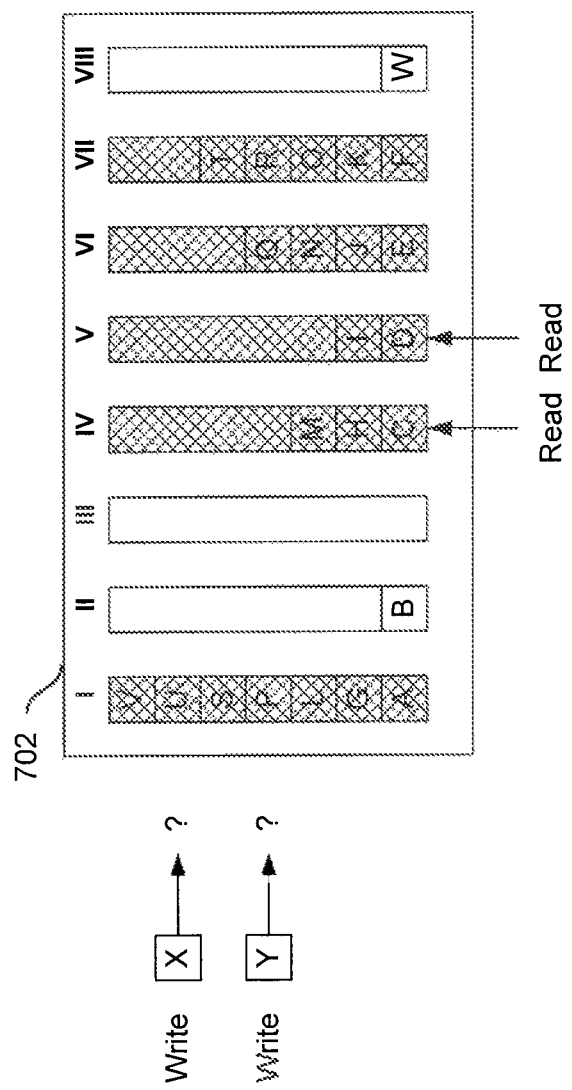
Figure 7E:
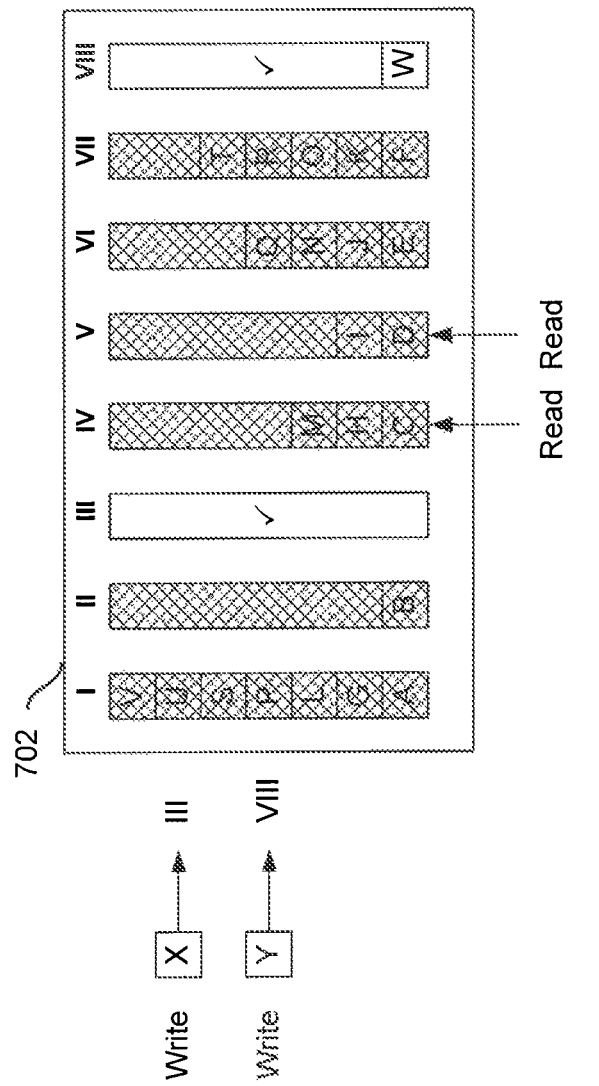

Next, according to various embodiments, the banks that have read accesses must be disqualified from the candidate set. As shown in FIG. 7D, bank V, while part of the candidate set, has a read access scheduled for the cycle. Accordingly, it has been disqualified from the candidate set.

Next, the buffer must select appropriate banks for writing the data. This is illustrated in FIG. 7D. As noted above, the buffer chooses the bank with the lowest fill level, which is bank III (fill level of 0). In this case, however, the buffer needs to choose two banks because there are two write access requests. Bank III is has the lowest fill level and no others tie it. Accordingly, the buffer can choose bank III for writing. Banks II and VIII have the next lowest fill level (both having a fill level of 1), but are tied in their fill level. As noted above, the buffer 702 can use the randomly assigned ranking (shown, e.g., in Table 2) to break the tie. In this case bank II has a rank of 5 and bank VIII has a rank of 7. Thus, since bank VIII has the higher rank, the buffer chooses it over bank II.

Figure 7F:
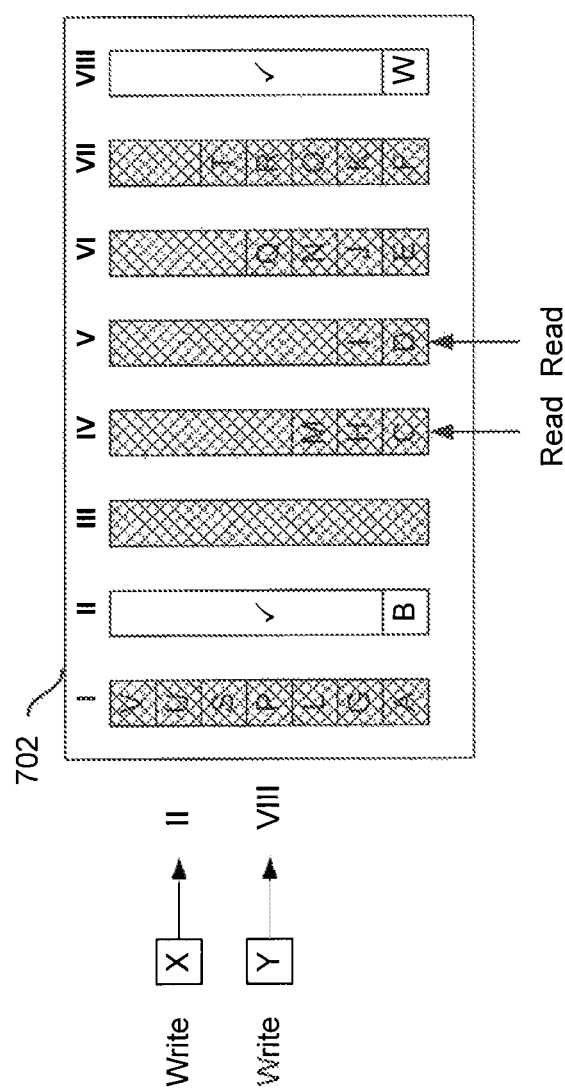

As noted above, the one or more of the LSBs of the fill level of the banks can be masked according to various embodiments in order to introduce extra randomness into the bank selection process. Table 1 shows a scenario where only a single LSB has been masked. In this scenario, the buffer would end up choosing different banks than those chosen in FIG. 7E. FIG. 7F depicts the situation where the least significant bit of the fill level is masked according to embodiments of the disclosure. In this case, since the least significant bit of the fill level is masked, each of banks II, III, and VIII appear to have the same fill level to the buffer 702. Accordingly, the buffer relies on the randomly assigned rankings, which in this case are 5, 4, and 7 for banks II, III, and VIII respectively. The buffer chooses the two highest rankings, which correspond to banks II and VIII, for writing the data.

Figure 8:
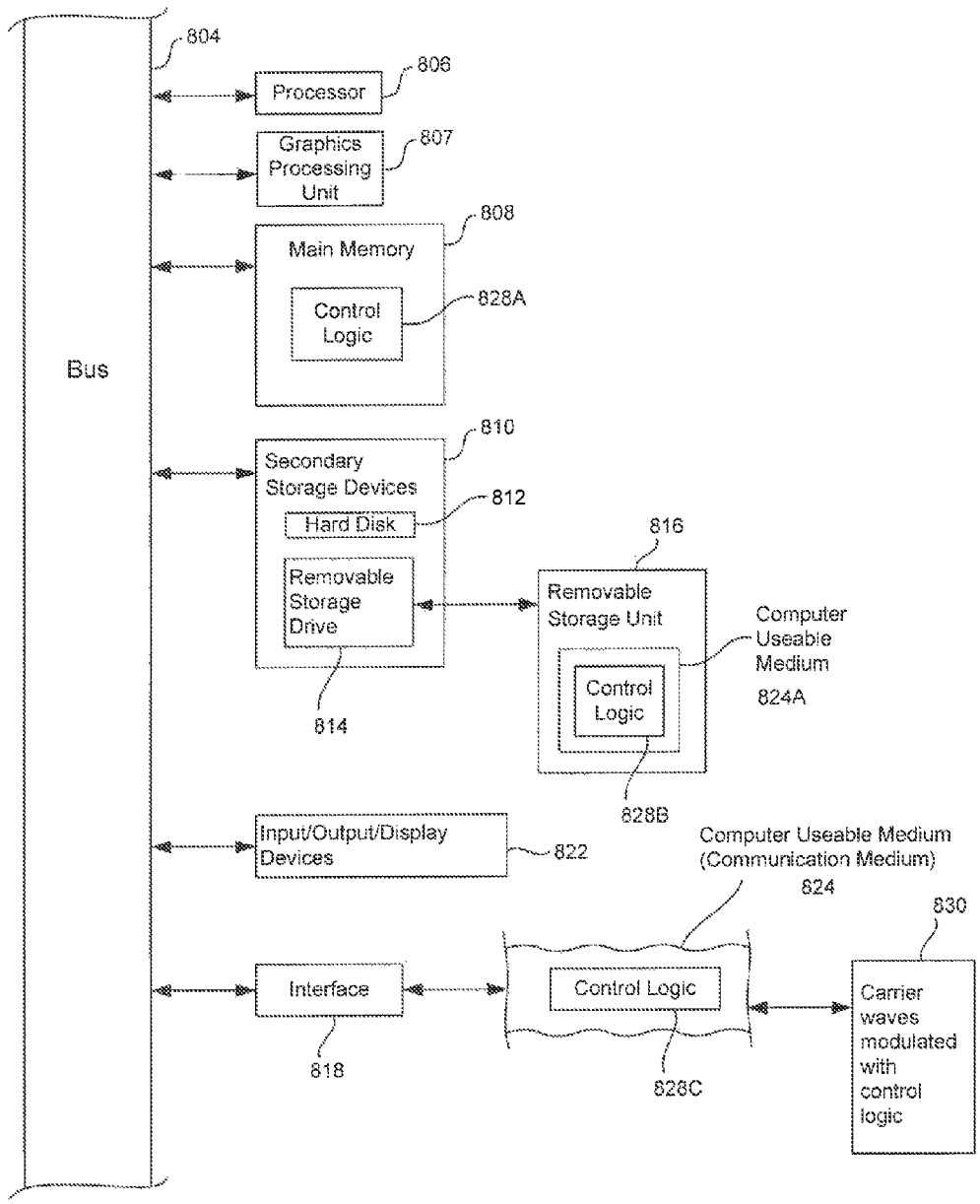
FIG. 8 illustrates a functional block diagram of a computer that can be used to implement various components according to embodiments of the disclosure.

In an embodiment of the present disclosure, the system, components, and functions described herein can be implemented using known computers configured based on the description provided herein, such as computer 800 shown in FIG. 8. For instance, controller 208 could be implemented as computer 800 that is programmed according to the algorithms and functions described herein.

Computer 800 can be any commercially available and well known computer capable of, and configured to, perform the functions described herein, such as computers available from International Business Machines, Apple, Sun, HP, Dell, Compaq, Digital, Cray, etc.

Computer 800 includes one or more processors (also called central processing units, or CPUs), such as a processor 806. The processor 806 is connected to a communication bus 804. Processors 806 may include any conventional or special purpose processor, including, but not limited to, digital signal processor (DSP), field programmable gate array (FPGA), and application specific integrated circuit (ASIC).

Computer 800 includes one or more graphics processing units (also called GPUs), such as GPU 807. GPU 807 is a specialized processor that executes instructions and programs selected for complex graphics and mathematical operations in parallel.

Computer 800 also includes a main or primary memory 808, such as random access memory (RAM). The primary memory 808 has stored therein control logic 828A (computer software), and data.

Computer 800 also includes one or more secondary storage devices 810. The secondary storage devices 810 include, for example, a hard disk drive 812 and/or a removable storage device or drive 814, as well as other types of storage devices, such as memory cards and memory sticks. The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. The removable storage drive 814 reads from and/or writes to the removable storage unit 816 in a well-known manner.

Computer 800 also includes input/output/display devices 822, such as monitors, keyboards, pointing devices, touchscreen displays, etc.

Computer 800 further includes a communication or network interface 818. The network interface 818 enables the computer 800 to communicate with remote devices. For example, the network interface 818 allows computer 800 to communicate over communication networks or mediums 824B (representing a form of a computer useable or readable medium), such as LANs, WANs, the Internet, etc. The network interface 818 may interface with remote sites or networks via wired or wireless connections.

Control logic 828C may be transmitted to and from computer 800 via the communication medium 824B. More particularly, the computer 800 may receive and transmit carrier waves (electromagnetic signals) modulated with control logic 830 via the communication medium 824B.

Any apparatus or manufacture comprising a computer useable or readable medium having control logic (software) stored therein is referred to herein as a computer program product or program storage device. This includes, but is not limited to, the computer 800, the main memory 808, the secondary storage devices 810, the removable storage unit 816 and the carrier waves modulated with control logic 830. Such computer program products, having control logic stored therein that, when executed by one or more data processing devices, because such data processing devices to operate as described herein, represent embodiments of the disclosure.

The disclosure can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method of writing, during a read/write cycle, data to a buffer having a plurality of banks, the method comprising:
    identifying unfilled banks of the plurality of banks to define a first subset of banks of the plurality of banks, each bank in the first subset of banks having a corresponding fill level value;
    assigning, independently of the corresponding fill level value, an ordered rank to the unfilled banks in the first subset of banks;
    selecting a pre-determined number of banks of the first subset of banks having the lowest fill level values to form a candidate set of banks;
    choosing a first bank from the candidate set based on the corresponding fill level value and the ordered rank of the banks in the candidate set; and
    writing at least a portion of the data to the first bank.

2. The method of claim 1, wherein selecting the candidate set includes excluding any banks that have a read access during the read/write cycle from the candidate set.

3. The method of claim 1, wherein the pre-determined number of banks in the first subset is greater than or equal to the number of read/write commands that are processed during a read/write cycle of the buffer.

4. The method of claim 1, wherein the ordered rank is randomly assigned to the first subset of banks.

5. The method of claim 1, wherein choosing the first bank comprises:
    determining that two banks have the same fill level value; and
    choosing from among the two banks the bank having the highest ordered rank.

6. The method of claim 1, further comprising masking a least significant portion of the fill level value for the banks in the first subset of banks so as to create a modified fill level value for each bank in the first subset of banks.

7. The method of claim 6, wherein selecting the pre-determined number of banks of the first subset of banks is based on the modified fill level values of the corresponding banks in the first subset of banks.

8. The method of claim 7, wherein choosing the first bank from the candidate set is based on at least one of the respective modified fill level value and the ordered rank of the banks in the candidate set.

9. The method of claim 1, further comprising determining that the data is multicast data.

10. The method of claim 9, wherein choosing the first bank comprises randomly selecting a bank from the candidate set without considering fill values.

11. A system configured to write data to a buffer during a read/write cycle, the system comprising:
  a hardware-based buffer comprising a plurality of banks configured to store data packets; and
  a hardware-based controller configured to:
    identify unfilled banks of the plurality of banks to define a first subset of banks of the plurality of banks, each bank in the first subset of banks having a corresponding fill level value;
    assign, independently of the corresponding fill level value, an ordered rank to unfilled banks in the first subset of banks;
    select a predetermined number of banks of the first subset of banks having the lowest fill level values to form a candidate set of banks from the first subset of banks;
    choose a first bank from the candidate set of banks based on the corresponding fill level value and the ordered rank of the banks in the candidate set; and
    write at least a portion of the data to the first bank.

12. The system of claim 11 therein the controller is further configured to exclude any banks that have a read access during the read/write cycle from the candidate set.

13. The system of claim 11, wherein the pre-determined number of banks in the first subset is greater than or equal to the number of read/write commands that are processed during a read/write cycle of the buffer.

14. The system of claim 11, wherein the ordered rank is randomly assigned to the first subset of banks.

15. The system of clam 11, wherein the controller is configured to choose the bank having a highest ordered rank when two banks have the same fill level value.

16. A method of writing, during a read/write cycle, data to a buffer having a plurality of banks, the method comprising:
  identifying unfilled banks of the plurality of banks to define a first subset of banks of the plurality of banks, each bank in the first subset of banks having a corresponding fill level value;
  randomly assigning a rank to the unfilled banks in the first subset of banks;
  masking a least significant portion of the fill level value for the banks in the first subset of banks so as to create a modified fill level value for each bank in the first subset of banks;
  selecting a pre-determined number of banks of the first subset of banks having the lowest modified fill level values to form a candidate set of banks;
  choosing a first bank from the candidate set having the lowest respective modified fill level value, including choosing the bank with the highest rank if two or more banks have the lowest respective modified fill level value; and
  writing at least a portion of the data to the first bank.

17. The method of claim 16, wherein selecting the candidate set includes excluding any banks that have a read access during the read/write cycle from the candidate set.

18. The method of claim 16, wherein the pre-determined number of banks in the first portion is greater than or equal to the number of read/write commands that are processed during a read/write cycle of the buffer.

19. The method of claim 16, further comprising:
  choosing a second bank from the candidate set having the second lowest respective modified fill level value, including choosing the second hank with the highest remaining rank if two or more banks have the second lowest respective modified fill level value; and
  writing at least a portion of the data to the second bank.

* * * * *

UNITED STATES PATENT AND TRADEMARK OFFICE
CERTIFICATE OF CORRECTION

| | | |
|---|---|---|
| PATENT NO. | : 9,112,727 B2 | Page 1 of 1 |
| APPLICATION NO. | : 13/591919 | |
| DATED | : August 18, 2015 | |
| INVENTOR(S) | : Lau et al. | |

It is certified that error appears in the above-identified patent and that said Letters Patent is hereby corrected as shown below:

In the claims:

In column 11, line 33, replace "claim 11 therein" with --claim 11, wherein--.

Signed and Sealed this
Twenty-second Day of March, 2016

Michelle K. Lee
*Director of the United States Patent and Trademark Office*